(12) United States Patent
Pool (10) Patent No.: US 8,645,422 B2
(45) Date of Patent: Feb. 4, 2014

(54) METHOD FOR CONTROLLING ACCESS TO INFORMATIONAL OBJECTS

(75) Inventor: Kenneth D. Pool, Dallas, TX (US)

(73) Assignee: Kenneth D. Pool, Dallas, TX (US)

( * ) Notice: Subject to any disclaimer, the term of this patent is extended or adjusted under 35 U.S.C. 154(b) by 1592 days.

(21) Appl. No.: 10/521,933

(22) PCT Filed: Aug. 12, 2003

(86) PCT No.: PCT/US03/25092
§ 371 (c)(1),
(2), (4) Date: Dec. 6, 2005

(87) PCT Pub. No.: WO2004/015542
PCT Pub. Date: Feb. 19, 2004

(65) Prior Publication Data
US 2006/0117389 A1  Jun. 1, 2006

Related U.S. Application Data

(60) Provisional application No. 60/402,805, filed on Aug. 12, 2002.

(51) Int. Cl.
*G06F 7/00* (2006.01)
*G06F 17/00* (2006.01)
*G06F 17/30* (2006.01)

(52) U.S. Cl.
USPC ........ 707/781; 726/1; 726/2; 726/21; 726/27; 713/167; 713/176; 713/168; 709/228; 709/229; 709/227; 707/782; 707/783; 707/784; 707/785; 707/786

(58) Field of Classification Search
USPC .......................................................... 713/168
See application file for complete search history.

(56) References Cited

U.S. PATENT DOCUMENTS

| | | | | |
|---|---|---|---|---|
| 5,675,782 A | * | 10/1997 | Montague et al. | 726/4 |
| 6,363,488 B1 | * | 3/2002 | Ginter et al. | 726/1 |
| 6,671,696 B1 | * | 12/2003 | Holcombe et al. | 1/1 |
| 6,850,938 B1 | * | 2/2005 | Sadjadi | 707/8 |
| 7,062,563 B1 | * | 6/2006 | Lewis et al. | 709/227 |

(Continued)

*Primary Examiner* — Nathan Flynn
*Assistant Examiner* — Bryan Wright
(74) *Attorney, Agent, or Firm* — Patent Capital Group (57) ABSTRACT

The described embodiments of invention comprises a method and an apparatus for regulating access to objects by authorized entities. Authorized entities are entities authorized for access by either an owner entity of the regulated object or an entity authorized to authorize access to the regulated object. Each user, which may be a physical person or another information system, is identified using standard user validation techniques. When an object is first created or introduced to the system, that information is associated with an owner, who is one user on the system. The present embodiment allows the owner to define relationships with other users, either generally or regarding a particular object. The owner may or may not have trusted relationships with other users. A second user that has a trusted relationship with the owner automatically has access to the object without additional intervention by the owner. In addition, the second user may have a trusted relationship with another user. In the above example, the records administrator may have an assistant. This third user will also have access to the records. This Web of Trust may link users infinitely, but such a case would create an undue risk of compromise of the information. Thus, the present embodiment includes a facility for the owner to designate a maximum number of trusted links from the owner and other users.

21 Claims, 3 Drawing Sheets

(56) References Cited

U.S. PATENT DOCUMENTS

| | | | |
|---|---|---|---|
| 7,181,017 B1 * | 2/2007 | Nagel et al. | 380/282 |
| 2002/0070844 A1 * | 6/2002 | Davida et al. | 340/5.53 |
| 2002/0138607 A1 * | 9/2002 | O'Rourke et al. | 709/224 |
| 2005/0033987 A1 * | 2/2005 | Yan et al. | 713/201 |

\* cited by examiner

METHOD FOR CONTROLLING ACCESS TO INFORMATIONAL OBJECTS

RELATED APPLICATIONS

This application is a National Stage of International Application No. PCT/US03/25092, filed Aug. 12, 2003, which claims the benefit of U.S. provisional patent application No. 60/402,805 filed Aug. 12, 2002.

TECHNICAL FIELD

The invention relates generally to a method and an apparatus for regulating access to objects. In particular, the invention relates to a system and method for controlling access to informational objects in a database system.

BACKGROUND OF THE INVENTION

Data is power. Entities capture data about other entities. A question naturally arises as to the ownership of that data. Does the entity that captures the data own the data? Does the entity that the data is about own the data? So long as the captured data was held behind "closed" doors (i.e. on a local computer or littled intra-firm network of computers) of the capturing entity and used in isolation behind those doors the question was of limited and isolated importance. So long as a minimal set of data was captured the question had minimal importance. So long as the use of the captured data was not extensive the importance of the question was not extensive. This has all changed. Information technology has increased connectedness to captured data. This increased connectedness has moved the data from behind closed doors out into the world. This increased connectedness has allowed the aggregation of minimal individual sets of data into massive, dynamic collections of data. This increased connectedness has provided access so that more and more use is made of the data When data is used it is to someone's benefit and frequently to someone else's detriment. The question of ownership is now crucial.

Generally, ownership implies an ability to control or regulate certain uses of an object. This implies that an operational definition of ownership must consider the object, the use, and the entity or entities that have control over that use of that object. The below described embodiments of the invention relate to a system and method to regulate the uses of objects by entities.

There is a growing concern over confidentiality of healthcare data. This growth is fueled by recent or impending increases in connectivity related to healthcare data. These increases are leading to healthcare data no longer being held behind the closed doors of the providers, aggregation of healthcare data across multiple sources, and potential access to the healthcare data by more and more entities. The concern over confidentiality is in great part a concern that the eventual use of the data by someone for their own benefit will be to the detriment of the patient. That detriment may be discrimination reducing employment, insurance, and financial opportunities. That detriment may something as "simple" as social embarrassment. The prevailing attitude is that with few exceptions the healthcare data of a patient should not be used to their detriment. The method of this patent is not limited in application to healthcare data but the problems of healthcare data generally serve well as examples to illustrate the execution of this method as it might be embodied and will be used as such in this patent.

Conventionally, entities protect objects by providing an access code, a key, a password, or the like, to those entities to which the owning entity would like to grant access. If an owning entity desires to grant access to the object(s) to another entity, the owning entity provides that entity an access code. Likewise, if an entity that holds an access code requires that a third party be granted access, the owning entity must issue an additional access code to the third party.

Commonly, however, when an entity that holds an access code requires that a third party be granted access, the entity holding the access code often divulges its access code to the third party so it may gain access. This weakens the access regulatory power of the system and fails to provide an accurate access log of entities accessing the object.

For example, if a doctor requires that his nurse have access to a patient's medical file, either the patient must grant the nurse access or, more commonly, the doctor provides the nurse with the doctor's access code with which the nurse utilizes to gain access to the patient's medical file. The act of the doctor disclosing his access code is an expression of trust between the doctor and the nurse but there is no documentation of or control over this relationship of trust. Thus, when the nurse uses the doctor's access code to access the records, an individual for whom there is no documented authorization, i.e. the nurse, has accessed the records, there is no documentation that the nurse has gained access, and there may be erroneous documentation that the doctor accessed the records. While this example illustrates a problem in the area of healthcare records, the same is true for any regulated-access object.

SUMMARY

The described embodiments of invention comprises a method and an apparatus for regulating access to objects by authorized entities. Authorized entities are entities authorized for access by either an owner entity of the regulated object or an entity authorized to authorize access to the regulated object.

Each user, which may be a physical person or another information system, is identified using standard user validation techniques. When an object is first created or introduced to the system, that information is associated with an owner, who is one user on the system. The present embodiment allows the owner to define relationships with other users, either generally or regarding a particular object. The owner may or may not have trusted relationships with other users. A second user that has a trusted relationship with the owner automatically has access to the object without additional intervention by the owner. For example, a doctor would usually establish a trusted relationship with her records administrator. Thus, the administrator will have access to all records created by the doctor.

In addition, the second user may have a trusted relationship with another user. In the above example, the records administrator may have an assistant. This third user will also have access to the records. Another user may be the doctor's insurance claim collection service. If the claim collections service's IT system is listed as a trusted user to the records administrator, they too will have access to the records. This Web of Trust may link users infinitely, but such a case would create an undue risk of compromise of the information. Thus, the present embodiment includes a facility for the owner to designate a maximum number of trusted links from the owner to other users.

An additional feature of the present embodiment is the ability to designate a specific user as distrusted. A user designated by the owner as distrusted will not be allowed access to the owner's object even though there is some chain of trusted relationships between the owner and the distrusted user. This provides an additional control on the extent of the Web of Trust.

DETAILED DESCRIPTION

The described embodiments of the present invention do not require that the method be embodied as an electronic or computer based product, however it is particularly well suited for such an embodiment. The method of this patent can address uses, objects, and entities that are not based in electronic environments however it is particularly well suited for the electronic uses, objects, and entities. An example of a an environment that is particularly well suited for the described embodiments is a network of clients and servers, such as Windows® based personal computers and servers connected locally using a well known protocol, such as Ethernet, a externally using the Internet. Preferably, the objects are stored on a server using a robust database program using, for example Microsoft's SQL Server®, and users are authenticated using facilities available in the database program. A preferred method for distributing software including the present invention is on a magnetic or optical storage medium for installation on the servers and/or personal computers. Ideally, the user interface to a system embodying this invention would be accessed using a standardized browser, such as Internet Explorer® or Netscape Navigator.®

There are characteristics of ownership that are often subtly different for electronic uses, objects, and entities that this method is particularly well suited to address. One common difference between "physical" and "electronic" objects is that many electronic objects are inexhaustible and often multiple simultaneous instances of the same object can exist. By looking at an element of data we generally do not use it up and in this sense it is inexhaustible. Several different entities can often look at the same data at the same time and thus there are effectively multiple simultaneous instances of the same object. While there may be examples of "physical" objects with both of these characteristics they are much less common in the physical environment. Many of our preconceptions and conventions of ownership are based on the exhaustibility and singularity of physical objects. As we implement methods of regulating the uses of objects by entities, which encompass the electronic as well as the physical environments, there will by necessity be adjustments to our preconceptions and conventions of ownership.

In this description, the reference to an owner is intended to reflect the ability of the owner entity to control the access to the object(s) for that use. In this model, there can be different entities that could control access to an object for different uses. Additionally, in this model there can be multiple entities that control access to an object for the same use. Thus, there can be multiple owners of an object.

For this method, the term entity refers to an individual, an organization, a company, a business, or a division of an organization, company, or business. The term entity may also be a collection of other entities such as associations, groups, or committees. For example, a committee is an entity that is a collection of entities that are individuals. An entity may also be an abstraction such as a role. An example would be an entity that is the "role of nurse" employed by a physician. The physician could establish the relationships between her/his role as physician and the role of "nurse". The physician would then designate a person as the individual entity currently filling this role. In the event the person for that role was to change, the physician would change only the designation of the individual entity currently filling that role from the old employee to the new employee. The "role of nurse" entity would survive changes in the individual entity that is designated as currently filling that role. The term entity may also refer to an object. For example, if an application needs to have access to another object then, in that context, the application may be considered an entity and this method allows the access to the object by this entity to be regulated just as it would be for any other type of entity. A "user" is an entity authorized to access a system, such as a database, where an object may be accessed. Users are authenticated using known authentication techniques for that system. For example, users may be given a username and password that the user must provide to gain access. Other more robust authentication techniques, such as biometric identification, PKI distribution, identification appliances or random synchronized passwords (such as the RSA SecurID®), may be used when the security needs justify the additional expense and inconvenience inherent in those techniques.

For this method, the term "object" includes several different concepts. Objects may comprise any data such as healthcare records, individually identifying data, financial transactions, or travel information regardless of how or where those records are stored. Objects may also comprise utilities such as computer applications, appliances, devices and hardware. Objects may also comprise areas such as physical or electronic restricted access areas or commercial/residential security systems. Objects in this method may also be collections of other objects. For example, a patient's healthcare record can be considered as an object but that record may consist of several other objects such as the laboratory records, the radiology records, the cardiology records, and the psychiatric records. Objects in this method may also be the information about the relationship between other objects. For example, one object might be the individually identifying information about a patient and another object might be the result of a HIV laboratory test. The ability to use the individually identifying information object might simply allow you to know that there exists a person by that name. The ability to use the HIV test object might simply allow you to know that there was a test performed with a specific result. The relationship between the objects is that they both refer to the same entity. Thus, having the ability to use the individually identifying object, the HIV test object, and the relationship object allows you to know that a person by that name had that test result. By treating the relationship between the individually identifying data object and the HIV test object as an object in its own rights allows the regulation of this information to be handled differently than the regulation of the other two objects.

A "path" is a connection of a relationship or relationships between two users. A path may be a simple direct path between two users or may follow relationships serially through several users. For example, if a patient has a trust relationship to a doctor and the doctor has a trust relationship to his nurse, there is a trusted path from the patient to the nurse, even though there is no established relationship between the patient and the nurse.

One novel aspect of this method is based on concepts of trust and distrust. This method assumes that there are entities that a user, as an entity, knows and explicitly trusts; that there are entities that the user knows and explicitly distrusts; and that there are entities about which the user is neutral in that the user has explicit opinion as to trusting or distrusting. The vast majority of the entities in the world fall into this later category either because the user does not know them or because the user does not have an opinion about them. In the preferred embodiment, a designation of explicit trust or distrust is unidirectional. That is, a first user may designate a second user as trusted, however that does not imply that the second user trusts the first user. Similarly, the first user may designate the second user as distrusted, however that does not imply that the second user distrusts the first user.

In this method, the use of an object is considered a task that is performed on or with the object(s). As it applies to the uses of objects by entities, a specification of trust can often be more easily understood as willingness on one user's part for the trusted entity "to be an agent acting on my behalf" when it performs the task on or with the object(s). Similarly a specification of distrust can be considered to be a statement that the user does not trust this entity to perform this task on or with the object(s). It is worthy of note that at times tasks may themselves be objects and thus may be regulated by the same methods.

Another novel aspect to this method is that within the context of the specifications of entities that are explicitly trusted or distrusted, it systematizes the relationship between a user, as an entity, and those neutral entities in a fashion that can dynamically adjust these relationships without direct intervention. In a preferred embodiment of this method there exist "paths of trust" which are sequences of trust relationship elements. Each element includes an indication of an entity (the "grantor") that is granting a status of trusted to another entity (the "grantee") and may be specific to the object(s) and task(s) that are covered by the relationship. A path of trust is a sequence of relationship elements such that for the first element the grantor is an entity with control of the object for the task. In the second and each subsequent element the grantee of that element is the grantor of the next element (if one exists). Thus, a path of trust between controlling entity and an entity that is requesting the right to perform a task on or with an object would be a path wherein the grantor in the first element was the controlling entity and the grantee in the last element is the requesting entity. By regulating access to an object for the task specified based on the existence of a path of trust, we have established a systematic method of determining an implicit relationship of trust between the controlling entity and the requesting entity in those conditions where there is no explicit trust between the controlling entity and the requesting entity.

Figure 1:
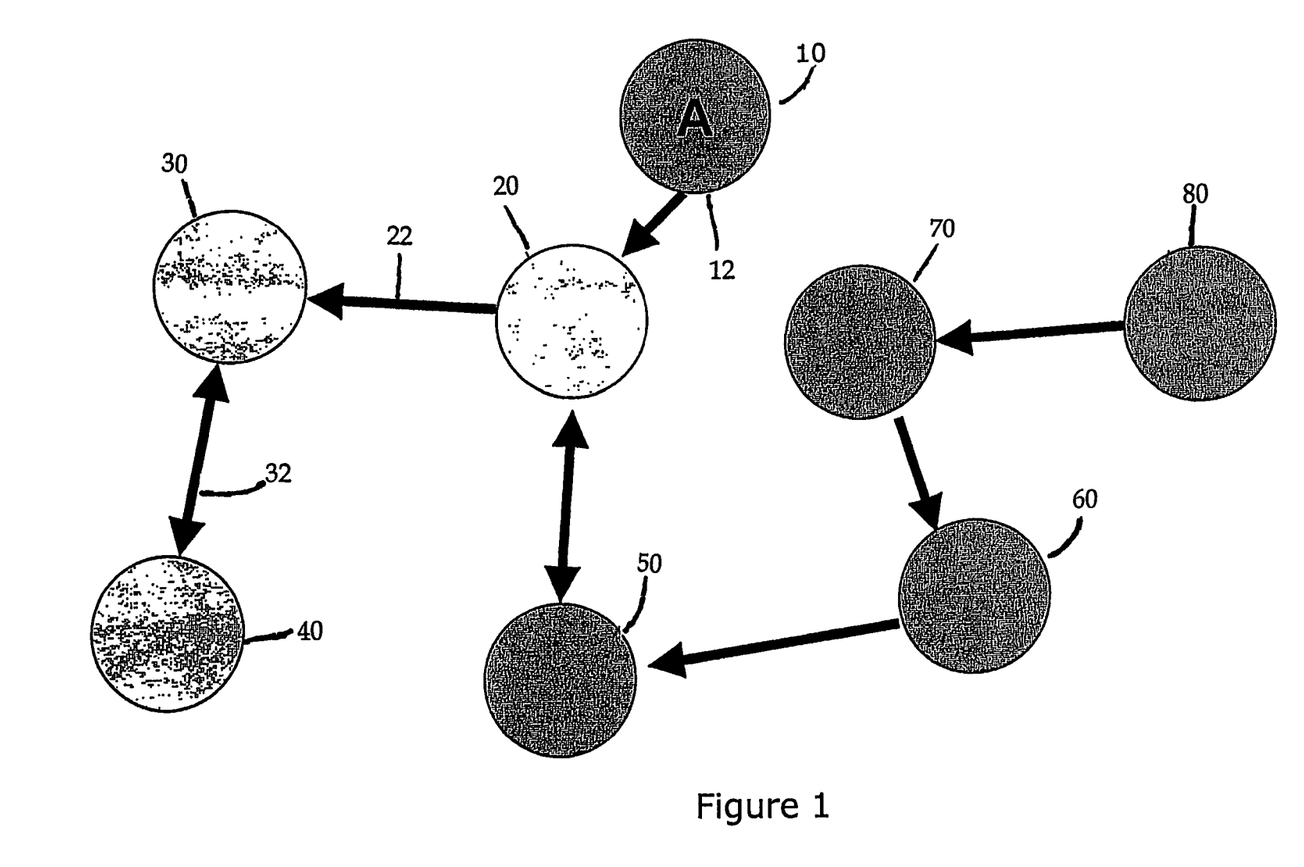
FIG. 1 is a chart illustrating a series of trusted relationships in one embodiment of the invention.
Figure 2:
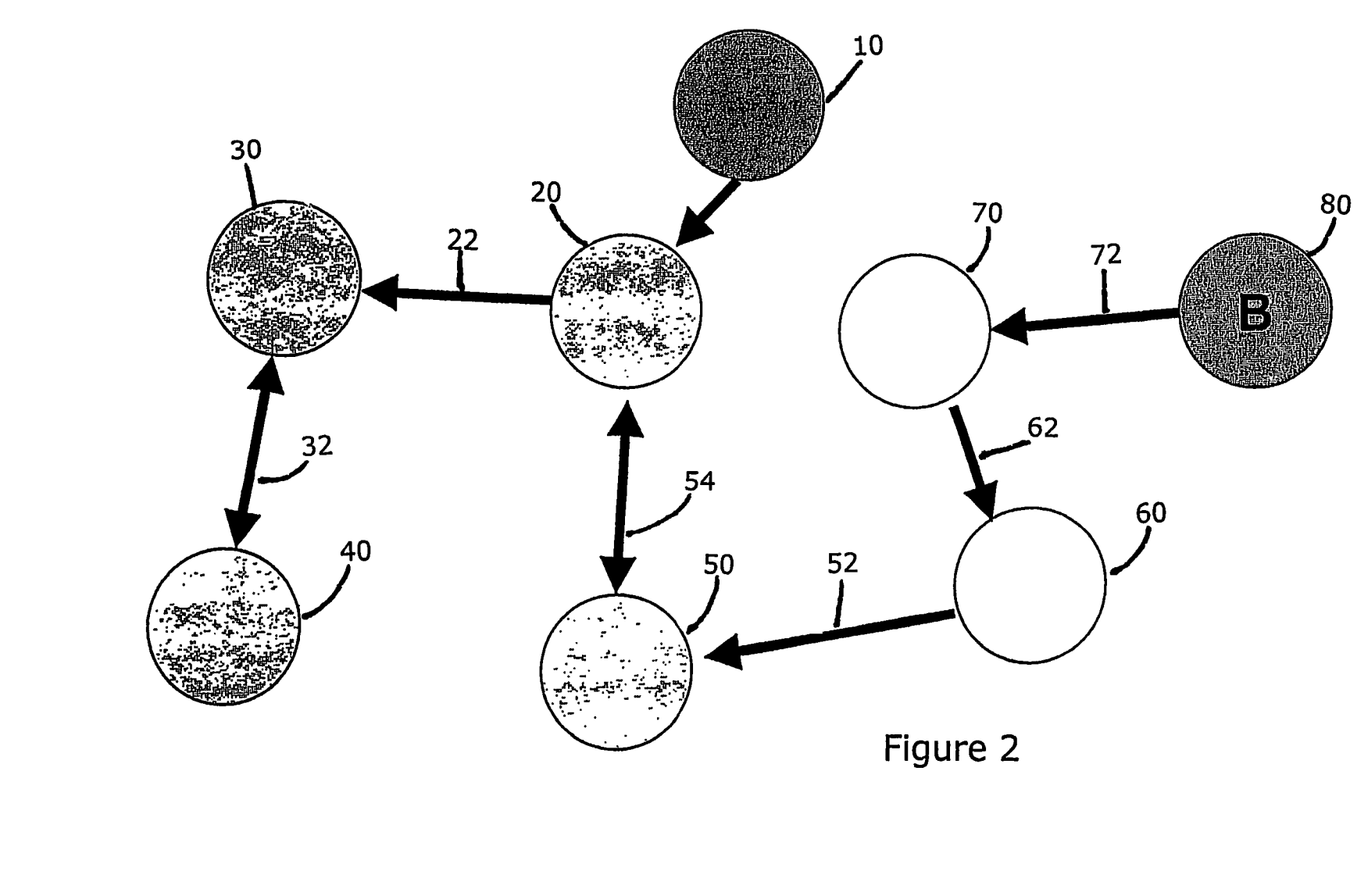
FIG. 2 is a chart illustrating another series of trusted relationships.

An example is illustrated in FIG. 1. In FIG. 1, user 10 is the owner of an object (not shown). User 10 has a trusted relationship 12 with user 20. User 20 has a trusted relationship 22 with user 30. User 30 has a trusted relationship 32 with user 40. Therefore user 40 would have access to the object for the uses encompassed by the most restrictive trusted relationship among relationships 12, 22 and 32. Another example is shown in FIG. 2. Here, User 80 has a trusted relationship 72 with user 70. User 70 has a trusted relationship 62 with user 60. User 60 has a trusted relationship 52 with user 50. User 50 has a trusted relationship 54 with user 20. User 20 has a trusted relationship 22 with user 30. User 30 has a trusted relationship 32 with user 40. Therefore user 40 would have access to the object for the uses encompassed by the most restrictive trusted relationship among relationships 12, 22, 32, 52, 54, 62 and 72.

An example in healthcare of the use of these paths of trust is in the event that a patient is hospitalized. Upon admission the patient might designate the organization of the hospital as trusted to act on behalf of the patient relative to the object of the patient's healthcare records. The organization of the hospital might designate the Director of Nursing as trusted to act in its behalf The Director of Nursing might designate the Nurse Manager for the floor to which the patient is admitted as trusted to act on her/his behalf. And lastly the Nurse Manager might designate the nurse assigned to the patient on this shift as trusted to act in her/his behalf. Thus, there would exist a path of trust from the patient to the hospital organization, from the hospital organization to the Director of Nursing, from the Director of Nursing to the Nurse Manager, and from the Nurse Manager to the nurse assigned to the patient. It would then be by way of this path that the nurse taking care of the patient would be able to access and add to the healthcare records of this patient.

In this method, if there are paths of trust embodied in the implementation, then each explicit designation of distrust may be further refined to determine the scope of impact of that distrust on the paths of trust. One refinement is the ability to designate that scope of impact is such that no element in a path of trust may include the distrusted entity (the "distrustee") as a grantee (intermediary scope). This essentially indicates that the user not only doesn't trust the distrustee, the user does not trust any other entity just because the distrustee trusts them. Alternatively, the designation could specify that the distrustee may only not be the grantee in the last element of a path of trust (terminal scope). That is, the distrustee cannot be the requesting entity. This specification essentially says that the user wishes to preclude the distrustee from access but if there is a path of trust that includes the distrustee that does not result in the distrustee gaining access this is acceptable.

Figure 3:
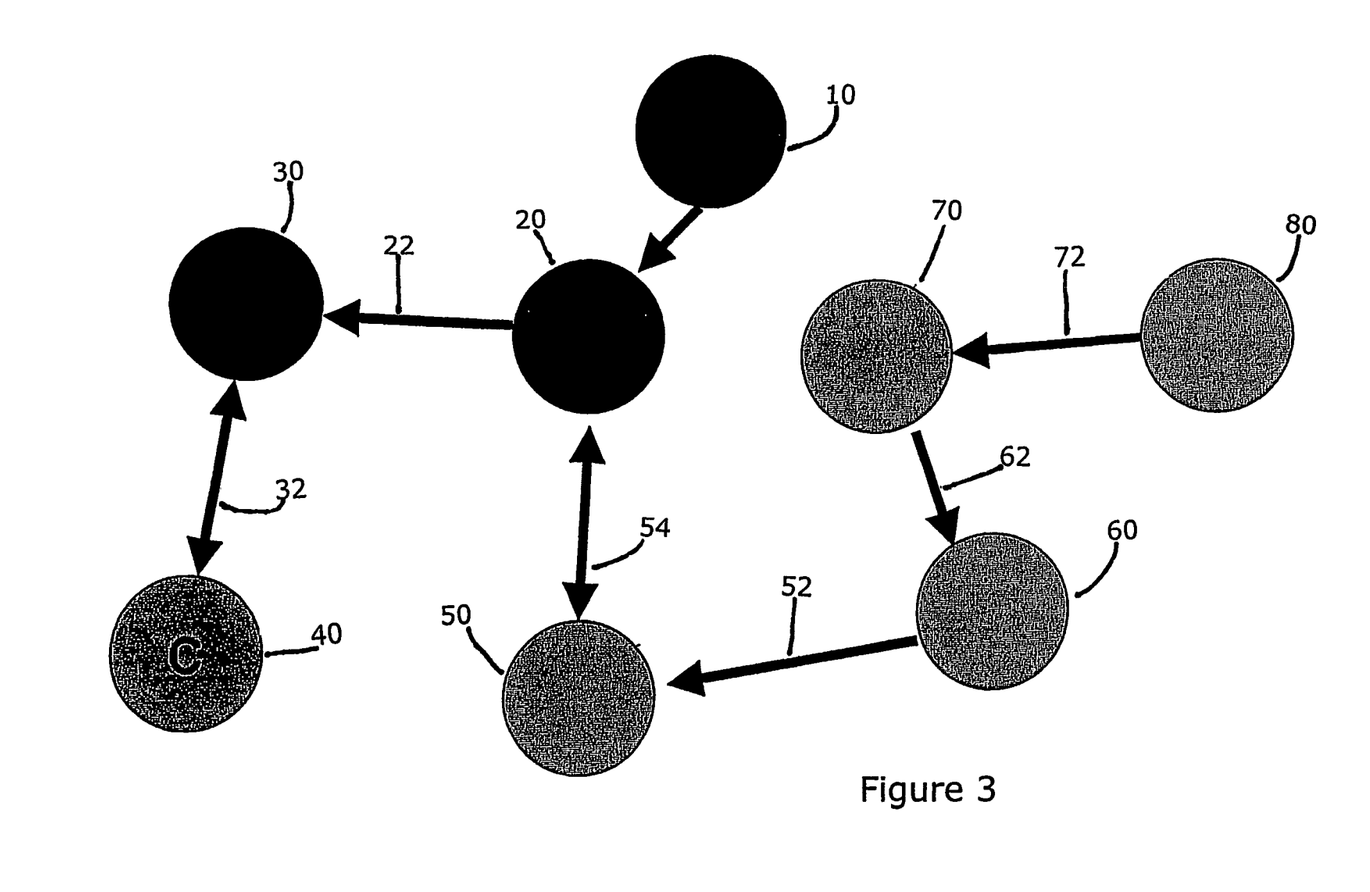
FIG. 3 is a chart illustrating a series of trusted relationships as in FIG. 1, but also including distrusted relationships.

An illustration of this is shown in FIG. 3. In this example, users 10, 20 and 30 are specifically distrusted by user 80. Therefore, even though user 50 has is trusted via relationships 72, 62 and 52, user 20 cannot access the object owned by user 80, in spite of trusted relationship 54. Similarly, user 30 cannot access the object owned by user 80, in spite of the trusted relationship 22. If the distrusted relationship of terminal scope, then user 40 can access the object owned by user 80 because of relationships 72, 62, 52, 54, 22 and 32. However, if the distrusted relationship of users 10, 20 and 30 is of intermiary scope, user 40 cannot access the object owned by user 80 because users 20 and 30 are on the only path between users 40 and 80.

Returning to the earlier example of a patient being hospitalized, consider the circumstance that the Director of Nurses is the sister-in-law of the patient. For personal reasons, the patient may not want the sister-in-law to have the ability to view their records and therefore designates the sister-in-law as distrusted. If the specification of distrust was of intermediary scope, then the path between the nurse assigned to the patient and the patient would be disrupted and neither the nurse caring for the patient nor the Nurse Manager would have access to the patient's records. If instead the specification of distrust was of terminal scope, then the path would remain intact and only the sister-in-law (Director of Nursing) would be precluded from access.

It is important to note that the method allows for the possibility that relationships of trust and relationships of distrust are dynamic and can be changed over time including the revoking of a relationship.

There are times that the user's trust for another entity is conditional. That is, a user may trust you if and only if certain conditions exist. An example might be that the user trusts you if you were identified by the system using a biometric measure but she might not trust you if you were identified just on the basis of a password or PIN. In this method, the trust relationship designation can also include a set of conditions that must be met for that trust relationship to be valid and used in a path of trust. Similarly, a distrust relationship can include a set of conditions that must be met for the distrust relationship to have an impact on access to the object. As an extension the conditional specification can also be a set of methods that are used to determine compliance rather than the conditions themselves or a combination of conditions and methods.

Unrestricted, the paths of trust could become very long and provide access to a much broader set of users than is desired. In order to provide a mechanism of restricting paths of trust without eliminating the benefits derivative from them, the preferred embodiment of this method would also include the ability to specify conditions that must be met for a relationship element to participate in a specific path. For example a common relationship of trust specification would include the condition that the path can only extend one user beyond this user. If the controlling entity was the grantor in that specification then no path could exist that included more than two users. With this limitation in place, user 60 would have access to an object owned by user 80, but user 50 would not, even though user 50 has a trusted relationship with user 60. Of course, this limitation can consist of any selected number of users on a path, including one user. Another perhaps less frequent example could be that the condition was that it was between the hours of 8 AM and 5 PM on a weekday. It is important to note that the conditions for participation in a path may be distinct from the conditions for validity of a trust or distrust relationship described in the preceding paragraph. Similar to the conditions for validity, the conditions for path participation can be any combination of conditions and methods.

In regard to sets of data objects, according to one aspect of a preferred embodiment of the present invention, a user may establish a nominal level of trust relationship with another relating to all data objects in a set of data. For example, a physician may say, nominally my nurse may see all data within all of my patients records. Additionally, the user can also establish exceptions to this nominal rule for certain data items within the data set. For example, while the nurse may be allowed to see all data within all of the physician's patients records according to the nominal relationship, a special relationship may be established for data identifying, for example, HIV status information. This special setting for the HIV status information would, in essence, override the nominal setting which would otherwise apply as regards the nurse's access permissions. The special setting can also change the number of levels through which the trust may be propagated. For instance, while a physician may allow her nurse to access all data within her patient's records and while the nurse may typically allow the nurse's assistant to access all information available to the nurse, the physician may establish a restriction on certain data items within the data set as far as inheritance goes. For example, the physician may say that nominally her nurse can access all data for all patients, including special information such as HIV status information, however, even though the nurse may access this special information, the nurse may not in turn establish a trust relationship with another which can provide access to this special information. Thus, in essence, while the nominal permissions for the data set may allow, for example, two or three levels of propagation, certain data items within the group may be restricted to a more limited number of levels of propagation.

Since each element in the path can have conditions that apply to it's participation in a path, the conditions that must be met for each element is the combination of all of the preceding elements in the path. This means that as paths grow longer the conditions become progressively more restrictive. It also means that just because the controlling entity did not impose any condition that does not mean that the paths from that entity will be unrestricted in terms of growth.

In this method, the trust or distrust between entities may be extremely specific. That is, different trust or distrust specifications may exist for different objects, sets of objects, or classes of objects. For an object, a set of objects, or a class of objects different trust or distrust specifications may exist for different tasks, sets of tasks, or classes of tasks. Some examples are, a user may trust his primary care physician to view all of his healthcare records; a user may trust his primary care physician to modify his primary care records but not include the ability of his primary care physician to modify his psychiatric records; a user may trust her cardiologist to view all of her healthcare records except for her psychiatric records; a user may trust the drug interaction software application at her pharmacy to use any of her healthcare records but to only modify the medication records; and a user may trust the pharmacist to only view his medication and medication allergy records.

In the preferred embodiment of this method, there exists a special trust relationship that relates to the task of "controlling in behalf of." Controlling in behalf of effectively makes the grantee in this relationship a controlling entity but preserves the ability of the grantor to revoke this right at any time. The major benefit of this special relationship is to facilitate the aggregation of sets of objects that can be managed in bulk. In the context of healthcare this "controlling in behalf of" relationship is more easily understood as "a provider of service" for a particular service. Thus, a cardiologist entity can be designated as a provider of cardiology services for those patients under the care of that cardiologist. The relationship of trust between the cardiologist and the physician who is on call for that cardiologist can then reference all the patients under the care of the cardiologist in a single relationship rather than one patient at a time. When a new patient comes under the care of the cardiologist, the cardiologist does not have to establish a relationship of trust with the on-call physician related to this patient since the existing relationship also applies to this patient.

An entity (entity A) may have access to a set of objects directly as a controlling entity. That same entity might also have access to a set of objects directly controlled by another entity (entity B). Thus, this entity has access to two distinct sets of objects. When entity A grants a relationship of trust to a third entity (entity C) it may wish to have that relationship of trust only apply to the set of objects under the control of entity B and not the objects under its own direct control. In order to accommodate this refinement, the model provides the capability for the relationship of trust to specify the controlling entity whose set of objects are covered by this relationship. In this case entity A would grant access to entity C relative to the objects under the control of entity B. Obviously, this would only have impact if entity B has granted access to entity A relative to the objects of entity B. This refinement is referred to a relationship relative to a root (the controlling entity).

Since in theory there can be more than one entity with control of an object (for a specific task or just for all tasks), it is possible that the relationships of one controlling entity lead to a determination that a request to perform a task on that object should be granted and the relationships of another controlling entity lead to a determination that the request should be denied. In order to accommodate this issue, the model provides the capability of designating classes of control of an object. The model further provides that these classes may be organized into a hierarchy. The determination derivative from the entity with the highest class of control is then the determination that is used.

In the event that for the highest class of controlling entity for an object, there is one or more entity of that class that would grant access and there is one or more entity of that class that would deny access, the method provides several alternative rules. Each rule either establishes that the conflict results in granting or in denying access. The lowest precedence is a system wide rule for the resolution of such a conflict, followed by a system wide rule that is specific for a class of objects, and that is followed by a rule for a specific object. The highest precedence rule is a rule that is effectively an agreement between specific pairs of entities. This agreement rule may cover all objects, a specific class of objects, a specific object, a task, a set of tasks, or combinations of these. This rule may be different depending on which entity would grant access, so that it is possible that the rule is that one entity always takes precedence. Each of these rules may also have attached a set of conditions or methods to determine a condition, which determine if the rule is valid and if so which resolution results.

Lastly, this method provides for the ability of an object to self-regulate controlling rights for itself. An object may grant or revoke controlling rights to entities or classes of entities based on sets of conditions or sets of methods to determine conditions.

Although specific embodiments of the present invention are herein described, these specific embodiments are not to be construed as limiting the scope of the invention. Other applications of the present invention will become clear to those skilled in the art in light of the teachings of this specification. For example, although the specification describes relationships among health care professionals, other fields were client confidences must-be maintained but access to that information allowed to certain users, such as accountants, will find advantageous use of the invention. The scope of the invention is only limited by the claims appended hereto.

The invention claimed is:

1. A computer implemented method for controlling access to informational objects in a database system comprising:
allowing, by a processor, each user of a plurality of users to designate, in a memory device, relationship characteristics between that user and any other user, wherein the relationship characteristics include at least one condition such that the relationship characteristics are valid only if the at least one condition is met;
identifying, in the memory device, one of the plurality of users as an owner of a data object;
determining, by the processor, electronic access to the data object by determining if the relationship characteristics on a first path between a first user of the plurality of users and the owner of the data object include a trusted relationship between each sequential pair of the users on the first path, wherein the first path comprises a first intermediate user beside said owner of the data object and the first user of the plurality of users;
allowing, by the processor, the first user electronic access to the data object based on a trusted relationship designated by the first intermediary user and a trusted relationship designated by the owner, wherein one of the relationship characteristics designated by the owner includes the trusted relationship with the first intermediary user of the plurality of users, wherein one of the relationship characteristics designated by the first intermediary user includes the trusted relationship with the first user of the plurality of users;
determining, by the processor, electronic access to the data object by determining if the relationship characteristics on a second path between a second user of the plurality of users and the owner of the computer data object include a trusted relationship or a distrusted relationship between each sequential pair of the users on that path, wherein the second path comprises a second intermediate user beside said owner of the data object and the second user of the plurality of users;
allowing, by the processor, the second user electronic access to the data object based on the trusted relationship designated by the second intermediary user and the terminal distrusted relationship designated by the owner, wherein one of the relationship characteristics designated by the owner includes a terminal distrusted relationship with the second intermediary user of the plurality of users, wherein one of the relationship characteristics designated by the second intermediary user includes a trusted relationship with the second user of the plurality of users;
determining, by the processor, electronic access to the data object by determining if the relationship characteristics on a third path between a third user of the plurality of users and the owner of the data object include a trusted relationship or a distrusted relationship between each sequential pair of the users on that path, wherein the third path comprises a third intermediate user beside said owner of the data object and the user of the plurality of users; and
defining, by the processor, one of the relationship characteristics designated by the owner includes an intermediary distrusted relationship with the third intermediary user of the plurality of users, wherein one of the relationship characteristics designated by the third intermediary user includes a trusted relationship with the third user of the plurality of users, wherein the third user of the plurality of users is prohibited from electronic access to the data object based on the distrusted relationship designated by the owner.

2. A computer implemented method as in claim 1 wherein the relationship characteristics include one or more methods of determining, by the processor, a condition such that the relationship is valid if and only if the one or more methods of determining a condition confirm validity of the relationships characteristic.

3. A computer implemented method as in claim 1 wherein in the memory device the owner of the data object may designate another user as acting on behalf of the owner.

4. A computer implemented method as in claim 1 wherein in the memory device the relationship characteristics include a trust relationship between a trusted user and a designating user.

5. A computer implemented method as in claim 1 wherein in the memory device the relationship characteristics include a trust relationship between a trusted user and a designating user, wherein the trust relationship limits tasks the trusted user may perform.

6. A computer implemented method as in claim 1 wherein in the memory device the relationship characteristics include a trust relationship between a trusted user and a designating user, wherein the trust relationship limits data objects the trusted user may access.

7. A computer implemented method as in claim 6 wherein in the memory device the trust relationship is limited to types of data objects.

8. A computer implemented method as in claim 6 wherein in the memory device the trust relationship is limited to selected data objects.

9. A computer implemented method as in claim 1 wherein in the memory device the distrusted relationship has an intermediary scope.

10. A computer implemented method as in claim 1 wherein in the memory device the relationship characteristics include a trust relationship between a trusted user and a designating user, wherein the trust relationship specifies a maximum number of relationships on a path.

11. A computer implemented method as in claim 10 wherein in the memory device the maximum number of relationships is one.

12. A computer implemented method for controlling access to informational objects in a database system comprising:
- allowing, by a processor, each user of a plurality of users to designate, in a memory device, relationship characteristics between that user and any other user, wherein the relationship characteristics include at least one condition such that the relationship characteristics are valid only if the at least one condition is met;
- identifying, in the memory device, one of the plurality of users as an owner of a data object;
- determining, by the processor, electronic access to the data object by determining if the relationship characteristics on a first path between a first user of the plurality of users and the owner of the data object include a trusted relationship between each sequential pair of the users on the first path, wherein the first path comprises a first intermediate user beside said owner of the data object and the first user of the plurality of users;
- allowing, by the processor, the first user electronic access to the data object based on a trusted relationship designated by the first intermediary user and a trusted relationship designated by the owner, wherein one of the relationship characteristics designated by the owner includes the trusted relationship with the first intermediary user of the plurality of users, wherein one of the relationship characteristics designated by the first intermediary user includes the trusted relationship with the first user of the plurality of users;
- determining, by the processor, electronic access to the data object by determining if the relationship characteristics on a second path between a second user of the plurality of users and the owner of the data object include a trusted relationship or a distrusted relationship between each sequential pair of the users on that path, wherein the second path comprises a second intermediate user beside said owner of the data object and the second user of the plurality of users;
- allowing, by the processor, the second user electronic access to the data object based on the trusted relationship designated by the second intermediary user and the terminal distrusted relationship designated by the owner, wherein one of the relationship characteristics designated by the owner includes a terminal distrusted relationship with the second intermediary user of the plurality of users, wherein one of the relationship characteristics designated by the second intermediary user includes a trusted relationship with the second user of the plurality of users;
- determining, by the processor, electronic access to the data object by determining if the relationship characteristics on a third path between a third user of the plurality of users and the owner of the data object include a trusted relationship or a distrusted relationship between each sequential pair of the users on that path, wherein the third path comprises a third intermediate user beside said owner of the data object and the user of the plurality of users,
- defining, by the processor, one of the relationship characteristics designated by the owner includes an intermediary distrusted relationship with the third intermediary user of the plurality of users, wherein one of the relationship characteristics designated by the third intermediary user includes a trusted relationship with the third user of the plurality of users, wherein the third user of the plurality of users is prohibited from electronic access to the data object based on the distrusted relationship designated by the owner.

13. A computer implemented method as in claim 12 wherein in the memory device the designated relationship characteristics between one of the users in the path and a sequential user in the path include one or more methods of determining, by the processor, a condition such that the designated relationship characteristics are valid if and only if the one or more methods of determining a condition confirm validity of the designated relationship characteristics.

14. A computer implemented method as in claim 12 wherein in the memory device the owner of the data object may designate another user as acting on behalf of the owner.

15. A computer implemented method as in claim 12 wherein in the memory device the designated relationship characteristics include a trust relationship between a trusted user and a designating user, wherein the trust relationship limits the tasks the trusted user may perform.

16. A computer implemented method as in claim 12 wherein in the memory device the designated relationship characteristics include a trust relationship between a trusted user and a designating user, wherein the trust relationship limits data objects the trusted user may access.

17. A computer implemented method as in claim 16 wherein in the memory device the trust relationship is limited to types of data objects.

18. A computer implemented method as in claim 16 wherein in the memory device the trust relationship is limited to selected of data objects.

19. The computer implemented method of claim 5 wherein in the memory device one of the sequential pairs of users in the path includes the trusted user and the designating user.

20. The computer implemented method of claim 6 wherein in the memory device one of the sequential pairs of users in the path includes the trusted user and the designating user.

21. The computer implemented method of claim 12 wherein in the memory device the owner has not designated relationship characteristics for any other user in the path besides a next sequential user relative to the owner.

* * * * *